United States Patent

Angstadt et al.

[15] 3,642,437
[45] Feb. 15, 1972

[54] PRODUCTION OF ALUMINA AND PORTLAND CEMENT FROM CLAY AND LIMESTONE

[72] Inventors: Richard L. Angstadt, Armonk; Russell N. Bell, Ardsley, both of N.Y.

[73] Assignee: Stauffer Chemical Company, New York, N.Y.

[22] Filed: Sept. 9, 1968

[21] Appl. No.: 758,485

[52] U.S. Cl. ................................... 23/143, 23/52, 23/110, 23/143, 106/103
[51] Int. Cl. ........................ C01f 7/02, C01f 7/30, C01f 7/34
[58] Field of Search ............................ 23/143, 110, 142, 52

[56] References Cited

UNITED STATES PATENTS

| | | | |
|---|---|---|---|
| 2,015,593 | 9/1935 | Derr | 23/143 X |
| 2,082,526 | 6/1937 | Stohr et al. | 23/141 |
| 2,442,226 | 5/1948 | Wall | 23/143 X |
| 2,544,231 | 3/1951 | Hollum et al. | 23/143 |
| 2,549,549 | 4/1951 | Wall | 23/143 |
| 2,604,379 | 7/1952 | Archibald | 23/143 |
| 2,637,628 | 5/1953 | De Vecchis et al. | 23/141 |
| 2,668,751 | 2/1954 | Porter | 23/143 |
| 2,859,100 | 11/1958 | Seailles | 23/143 |
| 3,486,850 | 12/1969 | Day | 23/143 |

*Primary Examiner*—Edward Stern
*Attorney*—Paul J. Juettner, Wayne C. Jaeschke and Martin Goldwasser

[57] ABSTRACT

Alumina is extracted from kaolin-type clays by admixing the clay with calcium oxide in an amount sufficient to obtain the mole ratios of $CaO:Al_2O_3$ within the range of from about 0.8/1 to about 1.2/1, and of $CaO:SiO_2$ from about 1.8/1 to about 2.2/1; calcining the mixture at about 1,300° C.; digesting the clinker with sodium carbonate; following the removing of the solid residue from the digestion solution, aluminum trihydrate is precipitated in the crystalline form of Gibbsite by treatment of the solution with carbon dioxide at elevated temperatures; and the precipitate is calcined to recover the desired alumina. The residue from the digestion step is used to form low-aluminate-containing portland cement.

5 Claims, 1 Drawing Figure

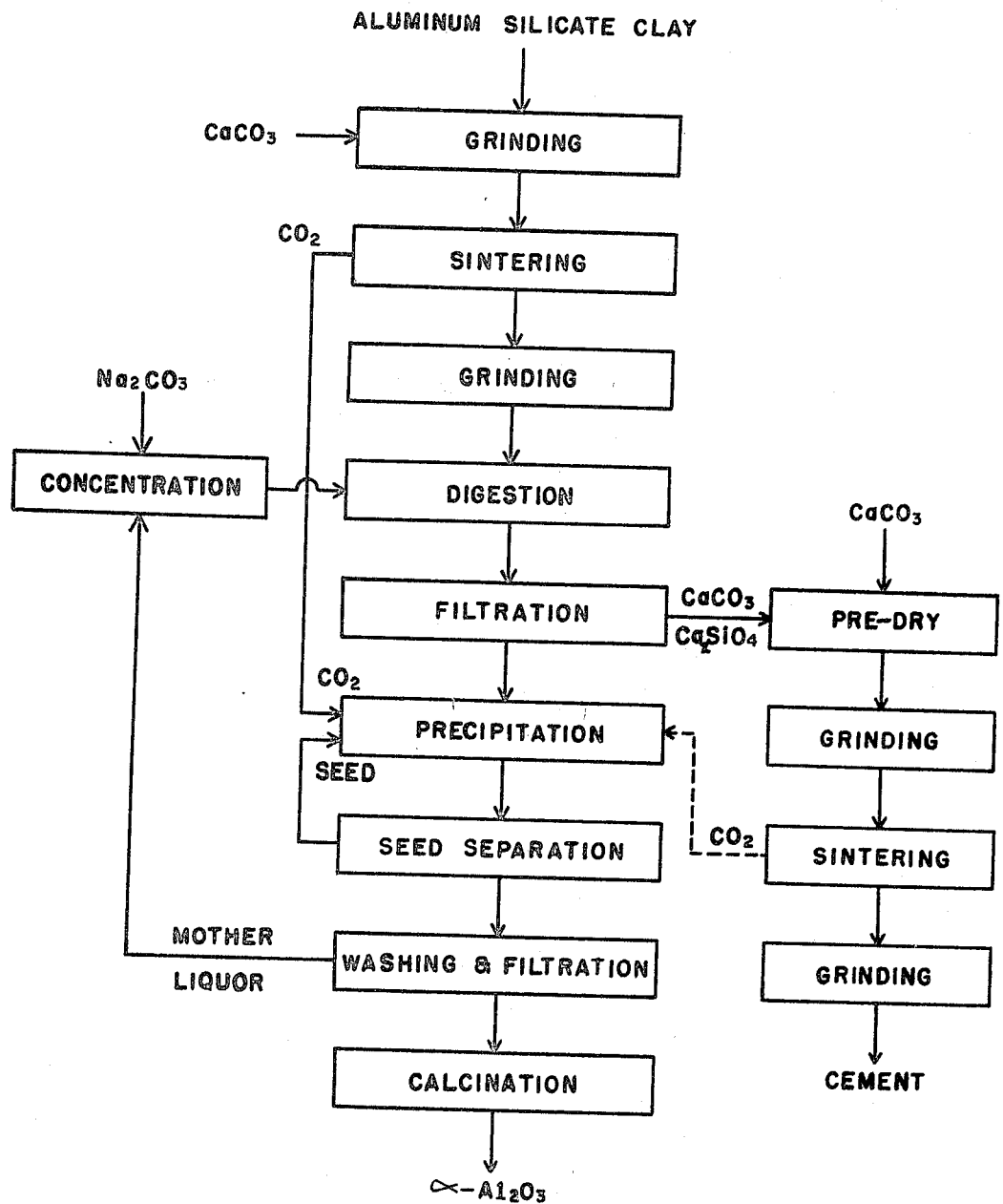

PRODUCTION OF ALUMINA AND PORTLAND CEMENT FROM CLAY AND LIMESTONE

The present invention relates to an improved method for producing alumina from low-bearing aluminum silicate clays. In particular, the present invention relates to the separation of the aluminum values in the form of alumina from aluminum silicate clays and the utilization of the silicate residues to prepare high-grade portland cement.

Alumina for use in the production of aluminum is presently being extracted from bauxite due to its higher alumina content and because it is more economical to process. However, the ever-increasing use of aluminum is depleting supplies of high-grade ores, and attention is now being turned to the development of economical processes for extracting aluminum values from low-grade ores such as clays. One such process, the lime-sinter process, involves burning limestone and clay at a temperature of about 1,300° C. in a rotary kiln and then subjecting the clinker to prolonged annealing. A large amount of limestone is required so as to convert the aluminum values to dicalcium aluminates ($5CaO \cdot 3Al_2O_3$) and the silica values to dicalcium silicates ($Ca_2SiO_4$). A sufficient amount of limestone is used to maintain a $CaO:Al_2O_3$ ratio of at least 1.3 to 1 and preferably 2 to 1 and the $CaO:SiO_2$ ratio of 2.0 to 1. The aluminates are extracted from the clinker by using a solution of sodium chloride and sodium carbonate leaving a residue rich in silicates. The silicates can be reburned with additional limestone to produce portland cement. Another process, the lime-soda-sinter process, is also used and this is similar to the lime-sinter process with the exception that an alkali metal carbonate is added to the sinter. This process is generally used in processing alkali metal containing clays such as nepheline.

Each of the foregoing processes suffers difficulties. The lime-sinter process requires the use of large quantities of limestone, thereby reducing the overall quantity of clay which can be processed in each sinter. The yields of alumina from the process are not high as some of the aluminates carry over into the residue due to the formation of compounds such as $Ca_3Al_2O$ which is not readily soluble in a sodium carbonate solution and $12CaO \cdot 7Al_2O_3$ which is only fairly soluble. When the residue is used to prepare portland cement, a lower grade cement is obtained due to the high aluminate contamination. Also, gypsum has to be added to the cement to retard hydration of the aluminate phase. Without the addition of the gypsum, the portland cement when mixed with water would harden immediately and be of no practical value. The lime-soda-sinter process, while applicable to alkali metal containing clays, cannot be used advantageously with aluminum silicate clays as there is a tendency to form alkali silicate gels which cause problems of gelation and difficulties in filtration in the processing system.

It has now been found that alumina can be economically extracted from low-grade aluminum silicate clays in high yield and purity and that a silicate residue low in aluminate content can be obtained for producing high-quality portland cement.

In accordance with the present invention, alumina can be extracted from aluminum silicate clays by the method which comprises, calcining an admixture of a substantially alkali-metal-free aluminum silicate clay and a calcium oxide containing material wherein the admixture has a $CaO:Al_2O_3$ mole ratio within the range of from about 0.8/1 to about 1.2/1, and a $CaO:SiO_2$ mole ratio of from about 1.8/1 to about 2.2/1, digesting the calcined ore with an aqueous alkaline solution of an alkali metal compound, separating the solution from the residue, and precipitating alumina values from the solution by treating the solution with $CO_2$ at a temperature within a range of from about 80° to about 100° C. followed by calcining the precipitate to obtain the desired alumina. The use of the specified ratios of CaO to $Al_2O_3$ to $SiO_2$ provides, as the main product, $CaAl_2O_4$ which is highly soluble in an aqueous alkaline solution of an alkali metal compound. The use of the specified digestion and precipitation steps provides high-percentage yields of alumina and, in addition, low aluminate containing calcium silicate byproduct. The low aluminate containing calcium silicate can be further processed by sintering with additional calcium-oxide-containing material to provide high-grade portland cement.

Reference is had to the accompanying FIGURE wherein there is shown a flow sheet of the process of the present invention.

The raw materials, i.e., the alkali-metal-free aluminum silicate clay and a calcium oxide containing compound such as limestone or calcium carbonate, are finely ground and intimately mixed. The amount of calcium oxide utilized in forming the mixture is such as to provide a $CaO:Al_2O_3$ mole ratio within the range of from about 0.8/1 to about 1.2/1 and, preferably, about 1/1; a $CaO:SiO_2$ mole ratio of from about 1.8/1 to about 2.2/1 and, preferably, about 2/1. The amount of calcium oxide containing compound to be added for each clay can be easily determined by analyzing the clay and computing the amount of calcium oxide compound necessary to provide the desired proportions. The mixture is then sintered at temperatures ranging from about 1,200° to about 1,500° C., and preferably around 1,300° C. The sintering can be accomplished in a rotary kiln or in a muffle-type furnace. The rotary kiln is preferred in as much as continuous agitation is applied to the admixture during sintering. The temperature of the kiln and the amount of time necessary for sintering are dependent on the composition of the mixture to be sintered.

Following the sintering of the mixture, the clinker is preferably ground to insure uniformity of particle size for ease of use in subsequent steps. A preferred particle size range is from about 15 to about 150 microns for ease of processing. This step is optional in as much as the clinker tends to disintegrate or dust on cooling.

The ground, sintered clay is then digested in an aqueous alkaline solution containing, as the primary cation, an alkali metal ion such as lithium ion, sodium ion, potassium ion, and the like. The alkali metal ion displaces calcium to form alkali metal aluminates which are soluble in aqueous solution and which can then be removed from the sinter. The anion for the alkaline solution is any of those anions which form alkaline solutions such as $OH^-$ and $CO_3^=$. The carbonate is preferred so that the liberated calcium can reform calcium carbonate which can be used in the further processing of the byproduct calcium silicate into clay. The remainder of the discussion relating to the digestion of the sinter will be directed to the use of sodium carbonate as the digestion material. This is for convenience of discussion and such discussion is not intended to be limited thereto.

The amount of sodium carbonate used in the digestion solution is preferably sufficient to provide a molar excess of $Na_2O$ per mole of alumina in the sinter. More preferably, the amount of sodium carbonate is sufficient to provide an excess mole ratio of $Na_2O$ per mole of alumina within the range of 1.3:1 to about 1.5:1. The sodium carbonate is preferably dissolved in a sufficient amount of water to provide a digestion solution which, when admixed with the ore, can be easily worked. The amount of water present during the digestion is not particularly critical though it is preferred that the digestion solution remain as concentrated as possible for effective digestion.

The digestion can be easily accomplished as a batch or continuous process as desired. For a batch operation, a kettle provided with an agitator and heating means can be utilized or a scrubbing tower with heating means can also be used. For continuous operation, a countercurrent bath treating tank with heating means can be used wherein ingredients are inserted into one end in sufficient quantities to maintain the desired mole ratio while extracting solution from the opposite end for further processing.

The temperature of the digestion bath can be any temperature between 0° C. and the boiling point of the digestion mixture, though it is preferred to use temperatures of from 70° to about 90° C. In as much as the rate of digestion is temperature dependent, the lower temperatures are less preferred in as much as a longer time is required to effect an equal amount of digestion than that required using elevated temperatures.

After digestion, the digestion liquor is separated from the solid residue and is combined with any wash water used in washing the solid residue. This combined admixture, basically, a sodium aluminate solution, is then treated further to precipitate the aluminum values. The solid residue consisting essentially of calcium carbonate and calcium silicate is set aside for further processing for the production of portland cement.

The sodium aluminate solution is preferably treated prior to the precipitation reaction to affect an adjustment in the molar content of sodium aluminate in the solution. The concentration of sodium aluminate in the solution is desirably maintained within the range of from 3.3 molar to about 3.6 molar for the easy precipitation and filtration of the aluminum values, though the molar concentration of the sodium aluminate can be within the range of from about 3 molar to about 4 molar. At the same time, it is also desirable that the $Na_2O:Al_2O_3$ ratio be maintained at from about 1.3 to about 1.5:1 within the solution, though the $Na_2O:Al_2O_3$ ratio can be maintained at from about 1.1 to about 1.7. Inasmuch as the normal processing procedure provides sodium aluminate solutions substantially more dilute than that desired, adjustment in concentration is generally accomplished by removal of a portion of the excess water from the mixture. This can be easily accomplished by evaporating under heat or by the use of flash evaporators or by the use of vacuum evaporators. The evaporation of the excess water is preferably accomplished by heating the mixture in that heating the mixture prior to precipitation of the aluminum value provides an additional advantage of increasing yield over those yields obtained where the mixture was evaporated but not heated.

The aluminum values in the form of aluminum trihydrate are precipitated from the sodium aluminate solution by contacting the solution with carbon dioxide, preferably, in the presence of a precipitation initiator seed. This seed can be a purified form of aluminum trihydrate such as Gibbsite. The precipitation of the aluminum trihydrate is accomplished under controlled conditions of temperature (in the presence of the carbon dioxide) so as to affect the precipitation of the trihydrate in a specific crystalline form known as Gibbsite, e.g., at a temperature within the range of from about 80° to about 100° C. By the use of such a temperature range, limited losses of product are encountered and a precipitate which is easily filtered is obtained whereas the use of lower temperatures provides precipitates which are not easily filterable. In the absence of the carbon dioxide, low yields of Gibbsite are obtained. Following the treatment with carbon dioxide, the precipitate, which is aluminum trihydrate, is filtered and washed and can be used as such or subjected to calcination to form aluminum oxide. Calcination is generally accomplished at temperatures within the range of 1,100° to 1,200° C.

The calcium silicate residues from the digestion process, which are substantially sodium aluminate free, can be further processed by adjusting the ratio of $CaO:SiO_2$ to about 5:2 to 3:1 by the addition thereto of calcium carbonate, to form low-aluminate calcium silicate portland cements. This further processing can be easily accomplished by first predrying the digestion residue and admixing therewith the additional limestone necessary to convert most of the calcium silicate into the desired $Ca_3SiO_5$ and grinding the mixture to provide a uniform particle size. The mixture is then sintered in a kiln at temperatures from 1,200° to 1,500° C. as described in connection with the original sintering of the clay. Any byproduct carbon dioxide can be metered off for use in other parts of the process, such as in the precipitation of the aluminum trihydrate from the sodium aluminate digestion liquor. The sinter can then be ground and packaged for shipment as portland cement. In as much as the cement has little or no aluminate concentration, the cement does not require the addition of calcium sulfate (gypsum) to retard the hydration of the aluminate phases and this type of cement has greater dimensional stability, greater ultimate strength, more rapid strength development and moderately low heat. All these attributes are generally apprised under the terminology "high-early-strength" portland cements of which this is a type.

The invention will be further illustrated in the examples which follow.

EXAMPLE 1

133 grams of (calcined) kaolin clay of the composition:

| | Percent |
|---|---|
| $Al_2O_3$ | 35.3 |
| $Fe_2O_3$ | 3.5 |
| $SiO_2$ | 53.3 |
| Other | 7.9 |
| ($TiO_2$, CaO, MgO, $K_2O$, $Na_2O$, $P_2O_5$, $H_2O$) | | is admixed with 300 grams of milled limestone (95 percent $CaCO_3$) so as to form an admixture having a $CaO:Al_2O_3$ mole ratio of 1:1, and a $CaO:SiO_2$ mole ratio of 2.0. The admixing is accomplished in a steel ball mill with sufficient moisture to make a paste. The paste is formed into bricks and fired in a muffle furnace at 1,350° C. for 3 hours. After cooling to ambient temperature, the clinker is ground to an average particle size of 200 mesh. 100 grams of the ground clinker, which analyzes:

| | |
|---|---|
| CaO | 55.40% |
| $Al_2O_3$ | 17.11% |
| $SiO_2$ | 24.94% | is admixed with a solution of 25 grams of sodium carbonate in 96 milliliters of water at 80° C. The admixture is held at 80° C. for 20 minutes and then filtered and the residue washed with 100 milliliters of water. The residue is set aside for further treatment. The wash water is added to the filtrate along with 4 grams of sodium aluminate seed crystals (Gibbsite). The solution is then evaporated by heating to a volume of 100 milliliters. The solution now has the following composition:

| | |
|---|---|
| $NaAlO_2$ | 3.5 molar |
| Molar Ratio $Na_2O:Al_2O_3$ | 1.4:1 |

This solution is then placed in a 500 milliliter flask equipped with an agitator, heating mantle and a gas inlet tube. The solution is heated to a temperature of from 80° to 90° C. and blanketed with carbon dioxide while agitating for 4 hours at 90° C. The solution is filtered and the precipitate is washed, and dried at 80° C. The total weight obtained is 27.7 grams, which, minus the 4 grams of seed crystals, equals 23.7 grams of product or 90 percent yield. The product analyzed as over 90 percent $Al_2O_3 \cdot 3H_2O$.

The residue from the sodium carbonate digestion step is an admixture of calcium silicate and calcium carbonate with other minor impurities. The ratio of calcium silicate to calcium carbonate in the residue is 2 to 1. Additional calcium carbonate is added to bring the ratio to 4:3. Prior to addition of the additional calcium carbonate, the residue is dried and then the dried residue and the calcium carbonate are ground and sintered at a temperature of 1,450° C. The clinker is ground and is an effective portland cement.

What is claimed is:

1. A process for extracting alumina in high-percentage yields from clay consisting essentially of:
   a. mixing a substantially alkali-metal-free aluminum silicate clay with a calcium oxide containing material selected from the group consisting of calcium oxide and calcium carbonate in an amount such that the mixture has a $CaO:Al_2O_3$ mole ration within the range of from 0.8/1 to 1.2/1 and a $CaO:SiO_2$ mole ratio of from 1.8/1 to 2.2/1;
   b. sintering said mixture at a temperature of from 1,200° to 1,500° C.;
   c. digesting the sintered material with an aqueous alkaline sodium carbonate solution, the amount of sodium carbonate being sufficient to provide a molar excess of $Na_2O$ per mole of alumina in the sinter;
   d. removing the solid residue from the digestion liquor;

e. contacting the digestion liquor with carbon dioxide and seed crystals of gibbsite while maintaining the solution at a temperature within the range of from about 80° to about 100° C. whereby a precipitate of aluminum trihydrate in the crystalline form of gibbsite is formed; and f. separating said precipitate, which is $Al_2O_3 \cdot 3H_2O$, from said solution.

2. Process as recited in claim 1 wherein said clay is kaolin.

3. Process as recited in claim 1 wherein the $CaO:Al_2O_3$ ratio is about 1:1 and the $CaO:SiO_2$ ratio is about 2:1.

4. Process as recited in claim 1 wherein said sintering temperature is about 1,300° C.

5. A process as recited in claim 1 wherein said precipitate is calcined to about 1,100°–1,200° C. following separation.

* * * * *